United States Patent [19]

Weishew

[11] Patent Number: 5,427,136
[45] Date of Patent: Jun. 27, 1995

[54] FLUID LEVEL DETECTION SYSTEM

[75] Inventor: Joseph J. Weishew, Springfield Township, Montgomery County, Pa.

[73] Assignee: The Langston Corporation, Cherry Hill, N.J.

[21] Appl. No.: 800,183

[22] Filed: Nov. 27, 1991

[51] Int. Cl.⁶ .................... F16K 31/02; G01F 23/02; G01F 23/26
[52] U.S. Cl. ..................... 137/392; 73/293; 73/304 C; 73/323; 101/364; 340/619; 340/620
[58] Field of Search .................. 137/386, 392, 433; 73/304 R, 304 C, 323, 293; 101/350, 364, 367; 340/619, 620; 354/324; 118/259

[56] References Cited

U.S. PATENT DOCUMENTS

| 2,018,959 | 10/1932 | Jordhoy | 101/364 |
|---|---|---|---|
| 2,320,417 | 6/1943 | Edelmann | 137/433 |
| 2,762,390 | 9/1956 | Rodenacker | 137/386 |
| 2,830,615 | 4/1958 | Borell et al. | 137/392 |
| 3,145,567 | 8/1964 | Bobrowsky | 73/295 |
| 3,311,834 | 3/1967 | Barker | 137/392 |
| 3,580,158 | 5/1971 | Scholle et al. | 137/392 |
| 3,596,673 | 8/1971 | Laucournet | 137/392 |
| 3,667,500 | 6/1972 | Stone | 137/386 |
| 3,835,881 | 9/1974 | Dal et al. | 137/392 |
| 3,908,206 | 9/1975 | Grewing | 137/428 |
| 4,188,634 | 2/1980 | Anderka et al. | 137/392 |
| 4,202,267 | 5/1980 | Heinzl et al. | 101/364 |
| 4,295,913 | 10/1981 | Purr et al. | 137/392 |
| 4,445,238 | 5/1984 | Maxhimer | 137/392 |
| 4,643,124 | 2/1987 | Switall | 118/259 |
| 4,841,321 | 6/1989 | Kose et al. | 137/392 |
| 4,852,604 | 8/1989 | Wales et al. | 137/392 |
| 4,930,416 | 6/1990 | Kawabata et al. | 101/364 |

FOREIGN PATENT DOCUMENTS 0433641 6/1991 European Pat. Off. .
3128887 2/1983 Germany .

OTHER PUBLICATIONS

Patent Abstract of Japan, vol. 6, No. 249 (M-177), Dec. 8, 1992.

Primary Examiner—George L. Walton
Attorney, Agent, or Firm—Seidel Gonda Lavorgna & Monaco

[57] ABSTRACT

A liquid level detecting device having an overflow reservoir, a flow restriction means and a level detecting means. The reservoir defines a cavity for collecting an electrically-conductive liquid overflowing from a container. This reservoir, which has a low level position associated therewith, includes inlet means through which the overflowing liquid enters, outlet means through which the collected liquid exits, and vent means through which built-up gases escape.

Flow restriction means controls the rate at which the collected liquid exits through the reservoir's outlet means. Flow restriction means is calibrated such that the rate at which liquid exits the reservoir does not exceed the rate at which liquid overflows therein.

In one embodiment, level detecting means includes a capacitive sensor switch which is fixedly secured to the reservoir to detect whether the liquid level is below the reservoir's low level position.

In another embodiment, level detecting means includes a positive and a negative electrical probe attached to, and/or associated with, the reservoir. The positive and negative probes are electrically insulated from one another, in electrical communication with the reservoir's cavity, and positioned to detect whether the liquid level is below the reservoir's low liquid level position.

In still another embodiment, an electrical probe is arranged to be in contact with ink overflowing from a second reservoir. This overflow condition is indicative that a normal flow of ink exists within the system.

23 Claims, 3 Drawing Sheets

FLUID LEVEL DETECTION SYSTEM

FIELD OF THE INVENTION

This invention relates to a device for monitoring and/or controlling liquid levels. Particularly, the invention relates to a device for detecting, monitoring and/or controlling the level of an electrically conductive liquid, such as paint or ink. More particularly, the invention relates to a device for detecting, monitoring and/or controlling the level of printing inks.

BACKGROUND OF THE INVENTION

Various devices detect, monitor and/or control the level of liquids. However, when the liquids whose levels are being detected, monitored and/or controlled are viscous (e.g., printing inks), problems are often encountered. For example, level monitoring devices for viscous liquids are generally quite complex. In addition, it is often difficult to easily and efficiently clean these complex devices; thus, increasing the possibility of false readings.

Notwithstanding the above, there are many different industries wherein it is critical to monitor the supply and/or level of viscous liquid. One example of an industry where liquid levels play a vital role is the printing industry.

In the printing industry, printing ink (a relatively viscous liquid) is often applied to a stencil (e.g., an impression cylinder). While there are many different ways in which to apply ink to such stencils, one of the more common approaches is to employ an ink distribution system. For example, a metering roll (e.g., an Anilox metering roll), which directly or indirectly comes into contact with an ink supply, is often used.

Flexography is one specific type of a printing process which often employs the use of metering rolls. In flexographic printing processes, ink is generally pumped from an ink source into an ink fountain or well until the level of ink reaches a predetermined full position.

As the metering roll rotates, it picks up ink from the full fountain. A doctor blade assembly is then often employed to control the amount of ink adhering to the outer surface of the metering roll.

Since ink is continually being picked up by the metering roll and ultimately distributed to the surface being printed, it is necessary to have a constant supply of ink to the fountain in order to maintain the "full" position. Maintaining a "full" position is often critical since, in many instances, if the ink level within the fountain falls below that predetermined full position, the particular printing process will be adversely affected. Accordingly, under these circumstances it is necessary to employ some sort of ink level detecting system. However, as stated above, most liquid level detecting devices are not adequate for measuring the level of viscous liquids such as printing inks. Moreover, those which do exist, are generally quite complex and difficult to clean. In view of the above, the printing industry would greatly welcome an improved, yet simplified, method for detecting, monitoring and/or controlling the level of viscous liquids such as printing inks. Such a device would also be greatly welcomed by other industries where it is necessary to detect, monitor and/or control the level of viscous liquids.

SUMMARY OF THE INVENTION

One object of this invention is to provide an improved method and device for detecting and/or monitoring the levels of viscous liquids within a container (e.g., an ink fountain).

Another object of the present invention is to provide an improved method and device for controlling the levels of viscous liquids within a container (e.g., an ink fountain). Yet another object of the present invention is to provide an improved device for detecting, monitoring and/or controlling the levels of viscous liquids, wherein the device is designed such that it can be easily and efficiently cleaned.

These and other objects, which will be apparent to those skilled in the art upon reading the detailed description of this invention, are achieved by the advent of a novel level detecting, monitoring and/or controlling device which relies, in part, on the electrical characteristics (e.g., conductivity) of the liquid whose level is being detected monitored and/or controlled.

The novel device of the present invention comprises: (a) an overflow collection reservoir, (b) a fluid flow restriction means and (c) a liquid level detecting system. The overflow reservoir defines a cavity for collecting any electrically-conductive liquid which overflows from the container which holds the liquid whose level is being detected, monitored and/or controlled. This reservoir, which has a predetermined low liquid level position associated therewith, includes: (a) an inlet means through which the liquid overflowing from the container can enter, (b) an outlet means through which the liquid collected therein can exit, and (c) a vent means through which gasses built up therein can escape.

The flow restriction means of the present invention controls the rate at which the collected liquid exits through the reservoir's outlet means. During normal operation, this flow restriction means, which is in fluid communication with the reservoir's outlet means, is calibrated such that the rate at which liquid exits the reservoir does not exceed the rate at which liquid overflows therein.

In one embodiment of this invention, the level detecting system comprises a capacitive proximity sensor switch. In this embodiment, the sensor switch is fixedly secured to the overflow reservoir such that it can detect whether the level of the collected liquid is below the reservoir's predetermined low level position.

In another embodiment of this invention, the liquid level detecting means comprises a positive electrical probe and a negative electrical probe. In this embodiment, the probes are attached to and/or associated with, the reservoir. Here, the positive and negative probes are: (a) electrically insulated from one another, (b) in electrical communication with the reservoir's cavity, and (c) positioned such that they can detect whether the level of the collected liquid is below the reservoir's predetermined low liquid level position.

In a further embodiment of this invention, the liquid level detecting means comprises an overflow reservoir and a electrical probe reservoir. The electrical probe is positioned in the central region of the overflow reservoir and is arranged to provide an electrical signal, to an external source, when it is in contact with the liquid in the overflow reservoir. The non-presence of this electrical signal is indicative of an alarm condition.

In all the embodiments, the liquid level detection means has a sensor switch that is positioned such that it can detect when the level of the collected liquid in the reservoir is below a predetermined amount.

BRIEF DESCRIPTION OF THE DRAWINGS

A more complete appreciation of the invention, and many attendant advantages thereof, will be readily obtained as the same becomes better understood by reference to the following detailed description, when considered in conjunction with the accompanying figures briefly described below.

DETAILED DESCRIPTION OF THE INVENTION

In the present invention, a device is provided which can be used for monitoring whether an electrically-conductive liquid within a container has fallen below that container's predetermined liquid level full position. This novel device comprises three major components. These are as follows: (a) an overflow collection reservoir, (b) a fluid flow restriction means, and (c) a level detecting system. As will be demonstrated later, these components need not be separate and distinct from one another.

The overflow reservoir of the present invention defines a cavity for collecting electrically-conductive liquid which overflows from the container which holds the liquid whose level is being detected, monitored and/or controlled. The overflow reservoir, which has associated therewith a predetermined low level position for the liquid being collected, includes: (a) an inlet means through which the liquid overflowing from the container can enter, (b) an outlet means through which the liquid collected therein can exit, and (c) a vent means through which gases built up therein can escape. The reservoir's inlet means is in fluid communication with the container's predetermined full level position. Preferably, the inlet means is positioned above the reservoir's predetermined low level position and opens through the reservoir's upper end portion.

The reservoir's inlet means is in fluid communica-tion with the container's predetermined full level position. This fluid communication can be achieved by any means known to those skilled in the art. For example, in the embodiments of the invention illustrated in FIGS. 1 and 2, the fluid communication between the container's full level position and the reservoir's inlet means is achieved by an interconnecting conduit. This will be discussed later in more detail.

Notwithstanding the above, it is also within the scope of this invention for the reservoir's inlet means to be in direct fluid communication with the container's full level position (i.e., no interconnecting conduit present therebetween). Here, while the reservoir can still be externally oriented to the container as illustrated in FIGS. 1 and 2, its inlet means can open directly into the container, at the container's predetermined full level position.

On the other hand, the reservoir can also be positioned within the container. Here, the reservoir's inlet means would still be positioned such that it is in fluid communication with the container's full level position.

Figure 1:
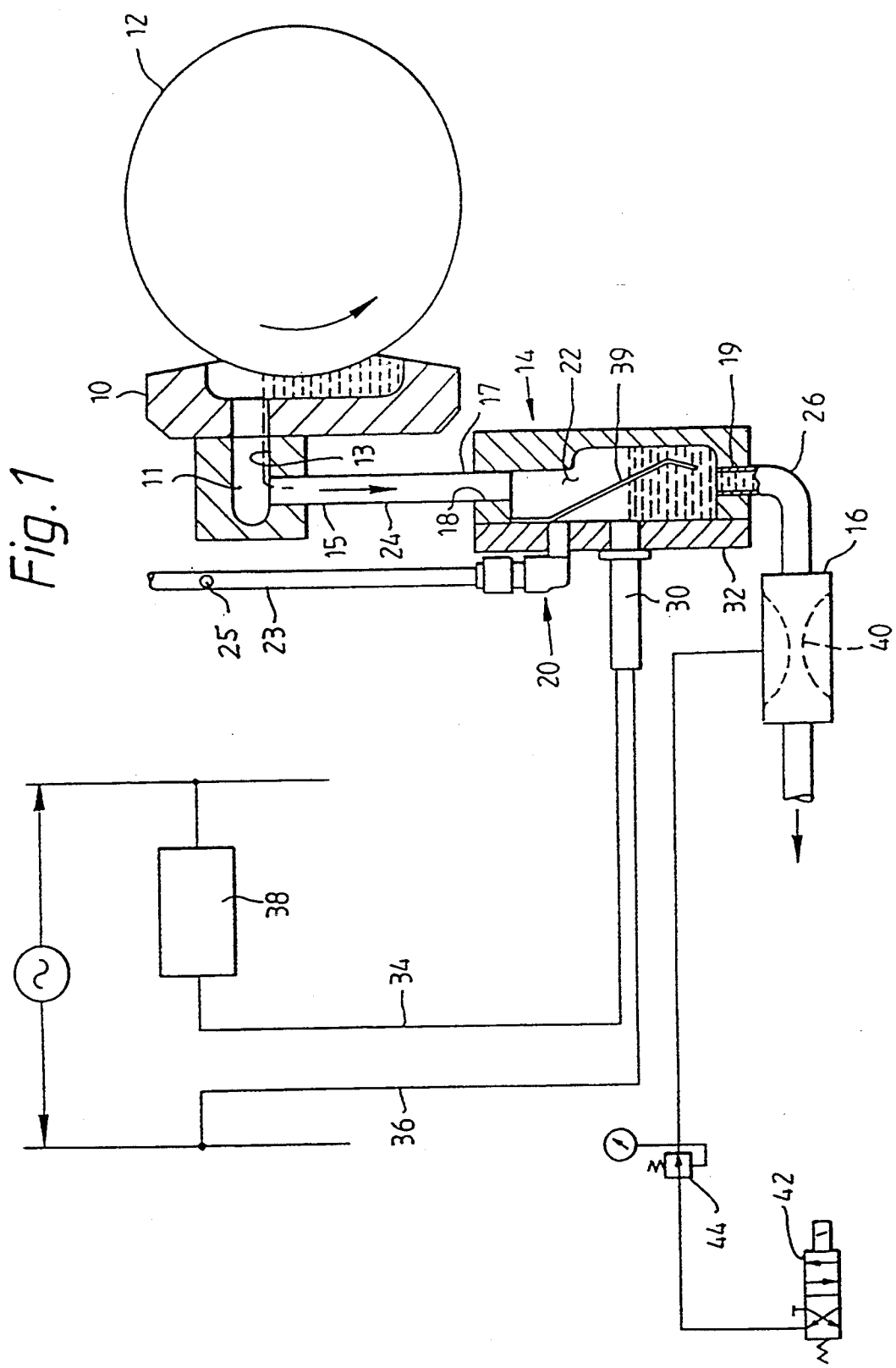
FIG. 1 is a schematic representation, partially in sections, of a printer ink fountain assembly employing one embodiment of the detecting, monitoring and/or controlling device of the present invention, wherein the level detecting system includes a capacitive proximity sensor switch.
Figure 2:
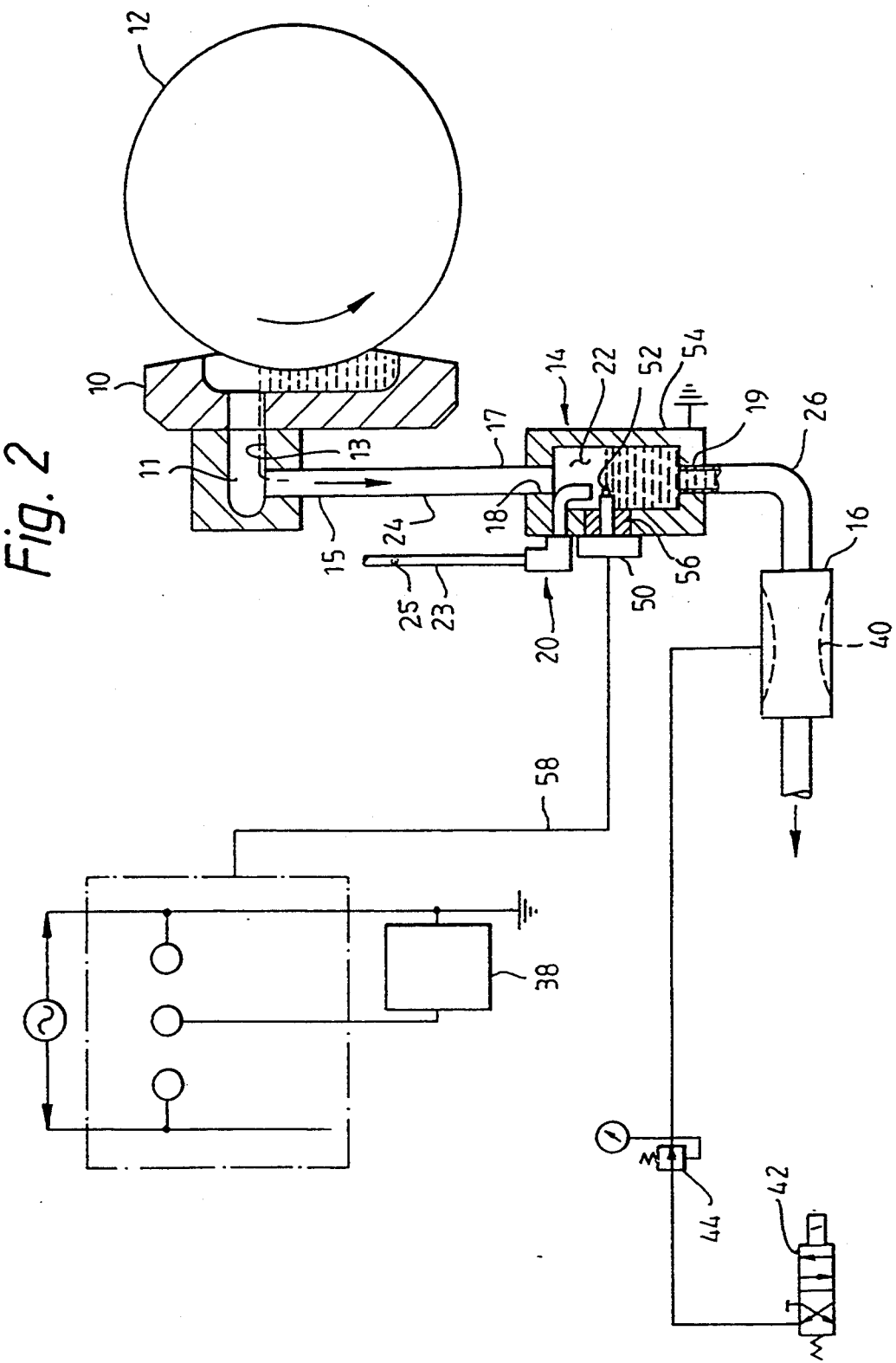
FIG. 2 is a schematic representation, partially in sections, of a printer ink fountain assembly employing one embodiment of the detecting, monitoring and/or controlling device of the present invention, wherein the level detecting system includes a positive electrical probe and a negative electrical probe.

It should be noted that, while the embodiments illustrated in FIGS. 1 and 2 employ an externally-oriented reservoir which is in fluid communication with the container's full level position via an interconnecting conduit, this is not necessarily the preferred embodiment. Rather, the preferred embodiment will depend, in part, on the specific desires and constructional limits of the end user.

The reservoir's outlet means is in fluid communication with the flow restriction means. This outlet means is positioned below the reservoir's predetermined low level position, and preferably, below the reservoir's inlet means. Generally, the outlet means will open through the reservoir's lower end portion.

As above, the fluid communication between the reservoir's outlet means and the flow restriction means can be achieved by any means known to those skilled in the art. For example, in the embodiments illustrated in FIGS. 1 and 2, the fluid communication is achieved by an interconnecting conduit.

However, it is also within the scope of this invention for the reservoir's outlet means to be in direct fluid communication with the flow restriction means (i.e., no interconnecting conduit present therebetween). Here, the reservoir's outlet means can open directly into the flow restriction means.

Moreover, it is also within the scope of this invention for the flow restriction means to be an integral part of the reservoir's outlet means, as opposed to being a separate, independent component. Here, the reservoir's outlet means would include a means for controlling the rate at which the collected liquid exits therefrom.

The reservoir's vent means is in gaseous communication with the reservoir's cavity. This vent means opens into the reservoir's cavity at a location which enables gases built up therein to escape. Preferably, the vent means is positioned above the reservoir's low level position.

Any suitable means known to those skilled in the art can be employed to vent built-up gasses out from the reservoir's cavity. In the embodiments illustrated in FIGS. 1 and 2, the reservoir's vent means comprises a vertically-oriented conduit extending above the upper end portion of the reservoir. If such a configuration is employed, the vent means can also function as a means for determining whether the reservoir's cavity is completely filled with the overflowing liquid. This feature can be very useful during the start-up procedures associated with the implementation of the present invention.

The fluid flow restriction means of the present invention functions to limit the rate at which fluid exists through the reservoir's outlet means. Any suitable means known to those skilled in the art can be employed for such purposes.

In the embodiments illustrated in FIGS. 1 and 2, the flow restriction means comprises a two-way pinch valve. There are, however, many different types of flow restriction means which can be used when practicing this present invention. The preferred flow restriction means will depend, in part, on the specific desires and constructional limits of the ultimate user.

The level detecting system of the present invention is designed to rely, in part, on the collected liquid's electrical characteristics (e.g., conductivity).

In one embodiment, the level detecting system comprises a capacitive proximity sensor switch which is adapted to focus into the reservoir's cavity. The manner in which a capacitative proximity sensor switch functions is considered to be well known to those skilled in the art. For this reason, it will not be discussed here.

By taking into consideration the liquid's electrical characteristic(s), the sensor switch is designed and/or calibrated to have a certain capacitive resistance when the electrically-conductive liquid is in electrical communication therewith. In addition, this sensor switch is also designed and/or calibrated such that, when the level of collected liquid is below the reservoir's predetermined low level position, the liquid is no longer in electrical communication with the sensor switch.

This absence of electrical communication will alter the capacitive resistance of the sensor switch. This change in capacitive resistance can, in turn, be used to signal that a low level position exists within the reservoir. In addition, this change can also be used to increase the rate at which the liquid is supplied to the container in order to reestablish a full level position therein such that the liquid will overflow into the reservoir and raise the collected liquid's level above the reservoir's predetermined low level position. This concept will be more fully explained when discussing the specific embodiment of the invention illustrated in FIG. 1.

In another embodiment of this invention, the level detecting system comprises: a positive electrical probe and a negative electrical probe. Here, the positive and negative probes are: (a) electrically insulated from one another, (b) in electrical communication with the reservoir's cavity, and (c) positioned such that they can detect whether the level of the electrically-conductive liquid, collected in the reservoir, is below the reservoir's predetermined low level position.

In this latter embodiment of a level detecting system, the liquid overflowing into the reservoir from the container serves as an electrical link between the positive and negative probes. However, the probes are positioned such that this link is established only when the level of the collected liquid is at or above the reservoir's predetermined low level position.

As with the former embodiment, when the liquid level in the reservoir is below the reservoir's low level position, the collected liquid will no longer be in electrical communication with the level detecting system (i.e., both the positive and negative probes). Therefore, the electrical link between these two probes will be broken.

This change in the electrical environment of the level detecting system can be used to: (a) signal that a low level position exists in the reservoir, and/or reestablish the full level position within the container. This concept will be more fully explained when discussing the specific embodiment illustrated in FIG. 2.

Referring now to FIG. 1, a schematic representation, partially in sections, of a printer ink fountain assembly is illustrated. In FIG. 1, the printer ink fountain assembly is doctor blade chamber 10. Chamber 10, which has an ink supply inlet (not shown), is sealed against Anilox metering roll 12.

Chamber 10 has a predetermined full level position associated therewith. In FIG. 1, the predetermined full level position is defined by the lower inside wall surface 13 of channel 11. Specifically, channel 11 opens through the side wall of chamber 10 and is in fluid communication therewith such that, when the liquid level in chamber 10 reaches its full level position, the liquid will begin to overflow into channel 11.

The apparatus illustrated in FIG. 1 also includes an overflow reservoir 14 which is in fluid communication with the predetermined full liquid level of chamber 10 and a flow restriction means 16. Reservoir 14 has associated therewith: (a) an inlet means 18, (b) an outlet means 19, and (c) a vent means 20. In addition, reservoir 14 also defines a cavity 22 in which liquid overflowing from chamber 10 is collected.

Reservoir inlet means 18 is in fluid communication with the predetermined full position of chamber 10. In the embodiment illustrated in FIG. 1, this fluid communication is accomplished by channel 11 and conduit 24. Specifically, the upstream end 15 of conduit 24 opens into channel 11; and, the downstream end 17 of conduit 24 opens into reservoir's inlet means 18.

Reservoir outlet means 19 is in fluid communication with flow restriction means 16. In the embodiment illustrated in FIG. 1, this fluid communication is accomplished via conduit 26.

Reservoir vent means 20 is in gaseous communication with reservoir cavity 22. In FIG. 1, reservoir vent means 20 includes a vertically-oriented tube 23. Since tube 23 extends above the upper end portion of reservoir 14, tube 23 can be employed as a means for determining whether reservoir 14 is completely filled with the overflowing liquid from chamber 10.

One method in which tube 23 can be employed for this purpose is by having the tube manufactured out of a transparent, translucent or any other material which allows for the passage of light. Another method is by having a sight glass 25 positioned accordingly in tube 23. In either instance, if a visual inspection of tube 23 should be able to indicate whether reservoir 14 is completely filled with liquid overflowing from chamber 10. As stated before, this feature would be extremely useful during the start-up procedure associated with the implementation of the present invention.

The level detecting system illustrated in FIG. 1 comprises capacitive proximity sensor switch 30. In this embodiment, sensor switch 30 is mounted in, but does not protrude through, the side wall 32 of reservoir 14.

Since the operation of sensor switch 30 depends, in part, on detecting a change in capacitive resistance resulting from the level of collected liquid within reservoir 14, sensor switch 30 is preferably electrically insulated from all of the materials and/or components which may affect such a change. Accordingly, in the embodiment illustrated in FIG. 1, side wall 32 of reservoir 14 is manufactured from an electrically-insulative material. Any suitable electrically-insulative material can be used. Preferably, however, the insulative material should not have a propensity to absorb the liquid collected within reservoir 14 since such a propensity may result in the production of false signals.

Sensor switch 30 is electrically connected to a voltage source via lines 34 and 36. A load light 38 is interposed between sensor switch 30 and the voltage source.

Sensor switch 30 is designed and/or calibrated such that, when the liquid level within reservoir 14 is at a level such that the two are in electrical communication with one another, a certain capacitive resistance exists. Now, as long as this particular capacitive resistance is present, load light 38 will function accordingly.

However, when the liquid level falls such that the electrical communication between the collected liquid and sensor switch 30 no longer exists, the capacitive resistance in sensor switch 30 will change. This change will cause load light 38 to indicate that the collected liquid is no longer in electrical communication with sensor switch 30. In view of the above, it can be seen that, by approximately positioning sensor switch 30, it can be employed to determine whether a low liquid level position exists in reservoir 14.

It has been observed that, depending on its sensitivity, sensor switch 30 may have the ability to read "drips" entering reservoir cavity 22 through reservoir inlet means 18. Moreover, since highly viscous liquids such as printing inks may drip for a long period of time, this inherent characteristic may result in false signals being produced. In order to overcome this possible problem, reservoir 14 has been equipped with a baffle means 39. As can be seen, baffle means 39 is designed to divert any drips from reservoir inlet means 18 away from the sensing range of sensor switch 30.

As stated above, flow regulation means 16 is pinch valve. More specifically, it is an air operated, bladder-type pinch valve assembly. While any suitable type of flow regulation means can be employed when practicing the present invention, it has been discovered that a bladder-type pinch valve assembly is especially useful when the liquid whose level is being monitored is a viscous printing ink.

In the embodiment illustrated in FIG. 1, flow restriction means 16 has an internal air bladder 40 (shown in phantom) associated therewith. The size of air bladder 40 is controlled by air valve 42 and pressure regulator 44. By adjusting pressure regulator 44, the size of air bladder 40 can also be adjusted. This procedure can be employed to precisely set and/or calibrate the rate at which the collected liquid exists reservoir 14 through its outlet means 19.

FIG. 2 also shows a schematic representation, partially in sections, of a printer ink fountain assembly. As with FIG. 1, the fountain assembly illustrated in FIG. 2 includes, among other things, doctor blade chamber 10, overflow collection reservoir 14, and flow regulation means 16.

While many of the components in FIGS. 1 and 2 are the same (i.e., like items having like numbers), the major difference between these two embodiments is the level detecting system employed. Specifically, in FIG. 2, the level detecting system comprises: (a) a switch 50, (b) a positive electrode 52, and (c) a negative electrode 54.

In FIG. 2, negative electrode 54 is the grounded, electrically-conductive body of reservoir 14. However, if the body of reservoir 14 is not manufactured from an electrically-conductive material, a grounded probe can be employed as the negative electrode.

In this latter embodiment, the positive and negative electrodes 52 and 54, respectively, are: (a) electrically-insulated from one another, (b) in electrical communication with the reservoir cavity 22, and (c) positioned such that they can detect whether the level of collected liquid in reservoir 14 is below the reservoir's predetermined low level position.

As can be seen, positive electrode 52 is electrically-insulated from negative electrode 54 by insulation means 56. Any suitable electrically-insulative material can be used as insulation means 56. As stated before, it is preferred that the insulative material does not have a propensity to absorb the liquid collected in reservoir 14 since such a propensity may result with false signals being produced.

Positive electrode 52 is electrically-connected to a voltage source via switch 50 and line 58. Load light 38 is interposed between switch 50 and the voltage source.

The level detecting system illustrated in FIG. 2 is designed such that, when the liquid in reservoir 14 is in electrical communication with both positive and negative electrodes 52 and 54, respectively, an electrical link will be made between these two electrodes since the collected liquid is electrically-conductive. As long as this electrical link exists, load light 38 will remain off.

However, when the liquid level falls such that the liquid is no longer in electrical communication with both of the electrodes, the electrical link between the two electrodes will no longer exist. This change in electrical environment will cause load light 38 to function. In view of the above, it can be seen that, by properly positioning positive electrode 52 and negative electrode 54, this level detecting system can be employed to determine whether a low liquid level position exists within reservoir 14.

Figure 3:
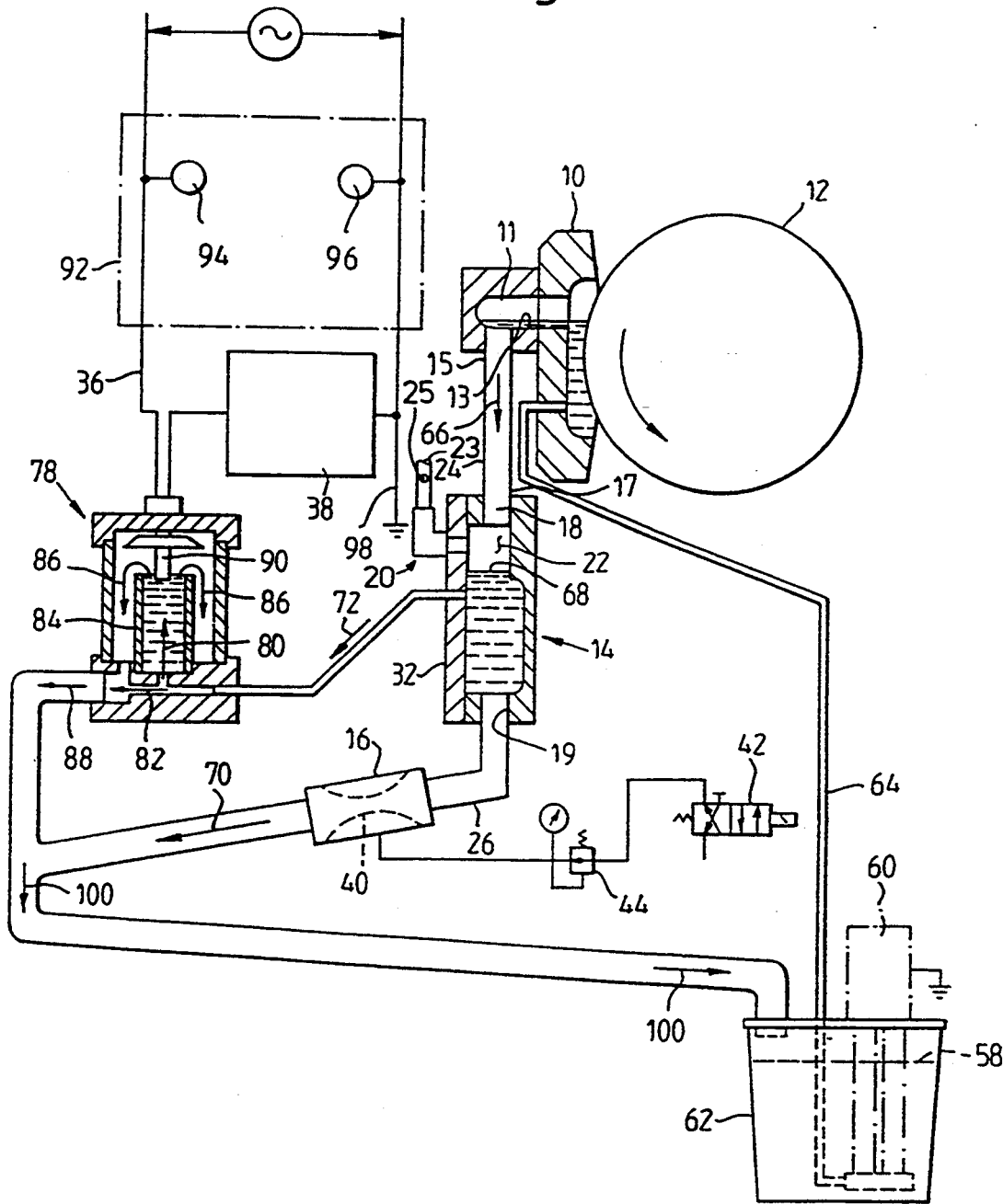
FIG. 3 is a schematic representation of a further embodiment for detecting, monitoring and/or controlling device that ensures for the presence of an adequate resource of ink for the printing fountain assembly related to the present invention.

A still further embodiment of the present invention is shown in FIG. 3 which is a schematic representation, partially in section, of a printing ink fountain assembly. In the same manner as shown FIGS. 1 and 2, the fountain assembly of FIG. 3 includes doctor blade chamber 10, overflow collection reservoir 14 and a flow regulation means 16. The embodiment of FIG. 3 also includes the reservoir vent means 20 the vertically-oriented vent tube 23 an optional sight glass 25 that provide the benefits previously discussed with regard to FIGS. 1 and 2. While many of the components of FIGS. 1, 2 and 3 are the same (i.e., like items having like reference numbers), the difference between each of the embodiments shown in each of the Figures is the associated level detection system.

In general, the system of FIG. 3 accurately detects a low ink condition of the doctor blade chamber 10 by sensing the absence of an overflow of the ink being supplied to chamber 10. As shown in FIG. 3, ink 58 is pumped by means, such as pump 60, from a holder, such as a pail 62, into a supply line 64. Ink flows upward therefrom and fills the doctor blade chamber 10 which is sealed against and supplies ink to the anilox roll 12. When the ink reaches the level of overflow and flows into chamber 11, as shown by arrow 66, the ink travels through the tube 24 into the collection reservoir 22. The ink then primarily flows through the air operated bladder type two-way pinch valve 16. Pressurized air is supplied to the pinch valve 16 from valve 42 through regulator 44. By adjusting the supplied pressure by means of regulator 44, the pinch valve bladder 40 can be partially closed and precisely set so as to restrict and control the ink flow to a desired amount.

During normal operation, ink begins to back up and accumulate in the collection reservoir 22 to a level 68. Partial or normal ink flow 70 proceeds through and exits from pinch valve 16 while, at the same time, an overflow condition is produced in reservoir 22. Overflow ink, as indicated by arrow 72, begins to flow and is directed into a probe mounting cylinder 78. The ink flow 72 divides into flows 80 and 82, with flow 80 being introduced into the bottom of a standpipe 84 which is supported in cylinder 78. The ink flow 80 fills standpipe 84 and overflows, as shown by arrows 86, to the bottom of cylinder 78. This overflow is drained away and merges with flow 82 so as to form flow 88.

A conducting probe 90 is mounted vertically in the top cap of cylinder 78 and cooperates with a closed switch box 92 and the load signal bell and light 38. As will be described, probe 90 is arranged to provide an electrical signal to the external device 38 when the probe is in contact with the ink in standpipe 84. The switch box 92 may be in the form of; a relay (not shown) having contacts 94 and 96. The switch box 92 is normally closed and probe 90 functions as half of an electrical circuit, such as the positive terminal. This circuit requires the electrical conductivity of the ink that the probe is immersed into, in order to complete the electrical circuit. The ink provides the electrical path to the negative terminal so as to complete the circuit. Because switch box 92 is normally closed, signal light 38 will function that is, be lit, until the ink contained in overflow 86 touches the end of probe 90 centrally located in the standpipe 84. The probe operates such that when a conductive liquid, such as water-based ink, touches probe 90, a complete electrical circuit is made through the ink by way of pump ground 98, thereby activating switch box 92 causing it to open and shut off light 38.

The condition of ink contacting the probe is indicative of a desired operation, wherein ink flows into the doctor blade chamber 10, overflows in chamber 10, and is circulated back to the supply container 62. By adjusting regulator 44 to compensate for a wide range of ink viscosities, a steady state circulating condition is achieved, with flows 88 and 70 combining to produce flow 100 which drains by gravity (pitch) back to and replenishing the ink in pail 62.

Conversely, if the ink overflow of doctor blade chamber 10 were to stop for any reason, the ink level 68 would drop in reservoir 22 by means of gravity which, in turn, would terminate the ink flow 72. Ink flow 80 into standpipe 84 would then cease, and the ink in standpipe 84 would drain out as part of flow 82. As soon as the ink in standpipe 84 drains below the tip of probe 90, the electrical circuit would be interrupted which, in turn, would switch box 92 to close and activate warning light 38.

The embodiment shown in FIG. 3 prevents a potential condition that may possibly exist in the embodiment shown in FIG. 2. This condition is that the electrical operation of probe 52 is dependent upon the characteristic of the ink itself, and, as such, is susceptible to producing erroneous reactions to a film formed by the ink. More particularly, printing ink is typically formulated to have high cohesive properties. Accordingly, even though ink may readily drain from a container, such as reservoir 14, a tenacious film quite often remains. This film is electrically conductive, and may cause the conductivity probe to give a false level indication, and accordingly, fail to produce an alarm. More particularly, even though the ink level in reservoir 14 may drop below its desired level, the ink, by moving down and wicking along the outer peripheral of probe 52, may form a residue film which still provides a conductive path for probe 52,thereby making it react as though it is still in contact with the ink.

The embodiment of FIG. 3, by virtue of the vertical mounting of probe 90 in the center of standpipe 84, overcomes such conditions created by the tenacious film. More particularly, the arrangement of FIG. 3 does not depend upon how much film remains on probe 90 or stays within standpipe 84 after draining occurs, because the electrical positive film (on probe 90) and the electrical negative film (of standpipe 84) are unable to contact each other unless an overflow condition exists, and thereby, prevents any false indications that would otherwise erroneously prevent alarm indications.

When practicing any embodiment of the present invention, the signal produced by the particular detection systems shown in either FIGS. 1, 2 or 3, can be used to reestablish the full level position in chamber 10. Specifically, the signal can be adjusted to accommodate any rate at which the ink is supplied to chamber 10. This increased flow rate can then be stopped once the full level position is reestablished.

The novel design of the present invention also facilitates cleaning procedures. For example, during the wash-up cycle, a cleaning solution can easily be introduced down through vent tube 23 and into reservoir cavity 22. Thereafter, this cleaning solution can be flushed from the reservoir through flow restriction means 16.

The present invention is extremely useful in detecting, monitoring and/or controlling a constant full level position in a container from which an electrically-conductive liquid is being depleted for one reason or another. In operation, an electrically-conductive liquid (e.g., a viscous printing ink) is continually supplied to a liquid distribution container (e.g., a chambered doctor blade ink fountain 10). Once the liquid level has reached that container's predetermined full level position, the liquid overflows into channel 11, down through conduit 24 and into overflow collection reservoir 14 through the reservoir's inlet means 18.

The liquid collected in reservoir 14 then flows through the reservoir's outlet means 19 to flow restriction means 16. If desired, the liquid flowing through flow restriction means 16 can be returned to the liquid distribution container.

In order to insure that the full level position is maintained in chamber 10, the rate at which the liquid is supplied thereto should not be less than the rate at which the liquid is being depleted therefrom. Generally, the rate at which liquid is supplied to the container exceeds the rate at which the liquid is depleted therefrom. In view of this flow rate differential, there will be a continual stream of liquid overflowing from the container into collection reservoir 14. During the start-up procedures when practicing the present invention, flow regulation means 16 is adjusted such that the rate at which liquid enters reservoir 14 through its inlet means 18 is significantly greater than the rate at which liquid exits reservoir 14 through its outlet means 19. This flow rate differential is maintained until the level of collected liquid in reservoir 14 is above the reservoir's predetermined low level position (i.e., the collected liquid is in electrical communication with the specific level detecting system employed). If vent tube 23 is manufactured from a transparent or translucent material, or if a sight glass is mounted therein, tube 23 can be used to determine when reservoir 14 is completely filled with the collected liquid.

When the liquid level in reservoir 14 is above its predetermined low level position, load light 38 will function accordingly. Thereafter, by calibrating flow restriction means 16 such that the rate at which liquid exits the reservoir through its outlet means is not greater than the rate at which liquid is entering therein, the level of liquid collected in reservoir cavity 22 will remain above the reservoir's predetermined low level position.

However, if for some reason the liquid level in chamber 10 should fall below its predetermined full level position, the liquid will cease to overflow into reservoir 14. Since the collected liquid within the reservoir will still be exiting the reservoir through its outlet means 19 at a set rate, the liquid level within reservoir 14 will begin to drop. If this flow rate differential is not rectified, the level of collected liquid in reservoir 14 will fall below the reservoir's predetermined low level position.

The specific level detecting system being employed can be positioned, in relation to reservoir 14, such that, as soon as the liquid level in reservoir 14 falls below the reservoir's predetermined low level position, the liquid is no longer in electrical communication with the level detecting system, load light 38 to function accordingly to indicate that a low level position exists in reservoir 14. Since the liquid level in reservoir 14 is dependent, in part, on the rate at which liquid overflows therein (i.e., rate at which liquid exits therefrom is maintained constant), the functioning of load light 38 in this manner can be used to indicate that the full level position in chamber 10 no longer exists.

It is evident from the foregoing that various modifications can be made to the embodiments of this invention without departing from the spirit and scope thereof which will be apparent to those skilled in the art. Having thus described the invention, it is claimed as follows.

That which is claimed is:

1. A device for monitoring whether an electrically-conductive liquid within a container has fallen below a container's predetermined full level position of said container, said device comprises:
   (a) overflow collection reservoir defining a cavity for collecting liquid overflowing from said container, said overflow collection reservoir having a predetermined low level position, and said overflow collection reservoir comprises:
      (i) inlet means through which said overflowing liquid enters said overflow collection reservoir cavity,
      (ii) first outlet means through which said collected liquid exits from said overflow collection reservoir, said first outlet means being positioned below said overflow collection reservoir's predetermined low level position,
      (iii) second outlet means through which said collected liquid exits from said overflow collection reservoir, said second outlet means being positioned at said overflow collection reservoir's predetermined low level position, and
      (iv) vent means for permitting escape of gases from said overflow collection reservoir;
   (b) flow restriction means in fluid communication with said overflow collection reservoir first outlet means, said flow restriction means selectably partially restricting the flow of said liquid therethrough;
   (c) second reservoir in fluid communication with said overflow collection reservoir, wherein the fluid communication between the overflow collection reservoir and the second reservoir is such that,
      (i) when the liquid level in the overflow collection reservoir is below its predetermined low level positioned, liquid will not flow from the overflow collection reservoir to the second reservoir, and
      (ii) when the liquid level in the overflow collection reservoir is at least at its predetermined low level position, liquid will flow from the overflow collection reservoir to the second reservoir, and
   (d) level detecting means for detecting when the level of said liquid is below said reservoir's low level position, said level detecting means comprises a probe which extends downwards into the second reservoir, and said probe being designed such that an electrically conducting path will exist between it and the liquid flowing into the second reservoir from the overflow collection reservoir when the liquid level in the second reservoir is such that the liquid physically contacts the probe.

2. A device as recited in claim 1, wherein said overflow collection reservoir's inlet means is positioned above said overflow collection reservoir's predetermined low level position.

3. A device as recited in claim 1, wherein the fluid communication between said overflow collection reservoir's inlet means and said container's predetermined full level position is achieved via a first interconnecting conduit, said first interconnecting conduit having an upstream end which is in fluid communication with said container's predetermined full level position, and a downstream end which is in fluid communication with said overflow collection reservoir's inlet means.

4. A device as recited in claim 1, wherein the fluid communication between said overflow collection, and first reservoir's outlet means and said flow restriction means is achieved via a second interconnecting conduit, said second interconnecting conduit having an upstream end which is in fluid communication with said overflow collection, and first reservoir's outlet means, and a downstream end which is in fluid communication with said flow restriction means.

5. A device as recited in claim 1, wherein said overflow collection, and reservoir's vent means comprises a vertically-oriented conduit extending above an upper end portion of said overflow collection reservoir.

6. A device for monitoring whether an electrically-conductive liquid within a container has fallen below a container's predetermined full level position of said container, said device comprises:
   (a) overflow collection reservoir defining a cavity for collecting liquid overflowing from said container, said overflow collection reservoir having a predetermined low level position, and said overflow collection reservoir comprises:
      (i) inlet means through which said overflowing liquid enters said overflow collection reservoir's cavity, said inlet means being in fluid communication with said container's predetermined full liquid level position,
      (ii) first outlet means through which said collected liquid exists from said overflow collection reservoir, and
      (iii) vent means for permitting escape of gases from said overflow collection reservoir, wherein said vent means comprises a vertically-oriented conduit extending above an upper end portion of said overflow collection reservoir, and wherein at least a portion of said vertically-oriented conduit is made from a translucent material;
   (b) flow restriction means in fluid communication with said overflow collection reservoir's first outlet means, said flow restriction means selectably partially restricting the flow of said liquid therethrough; and (c) level detecting means having a sensor for detecting when the level of said liquid is below said overflow collection reservoir's low level position.

7. A device as recited in claim 6, wherein said vertically-oriented conduit comprises a means for viewing at least a portion of the cavity defined thereby.

8. A device as recited in claim 7, wherein said viewing means comprises a sight glass.

9. A device as recited in claim 1, wherein said probe, which is positioned in the central region of said second reservoir, is designed to provide an electrical signal to an external source when said probe is in contact with said liquid received from said overflow collection reservoir.

10. A device as recited in claim 9, wherein said probe is positioned to contact the liquid which overflows out of said second reservoir.

11. An apparatus for maintaining a predetermined full level of a liquid in a container from which liquid continuously passes, comprising:

(a) a main reservoir for the liquid;

(b) means for feeding liquid into the container from the main reservoir at a rate such that the liquid being fed therein overflows from the container through an overflow outlet at a position corresponding to the desired level of liquid in the container;

(c) an overflow collection reservoir designed to receive and collect at least pan of the liquid flowing from the overflow outlet, said overflow collection reservoir having at least a first outlet through which liquid flows therefrom to the main reservoir, and a predetermined full liquid level, wherein said first outlet being positioned below said predetermined full liquid level;

(d) means for detecting when the liquid received and collected in the overflow collection reservoir is below the overflow collection reservoir's predetermined full liquid level; and (e) means for generating a signal when said detecting means detects that the liquid received and collected in the overflow collection reservoir is below the overflow collection reservoir's predetermined full liquid level.

12. Apparatus according to claim 11 further comprising an adjustable restrictor designed to control the rate at which the liquid received and collected in the overflow collection reservoir from the overflow flows through said reservoir first outlet.

13. Apparatus according to claim 11 further comprising a vent pipe in gaseous communication with the reservoir.

14. Apparatus according to claim 11, wherein the container is part of a printing device.

15. An apparatus as recited in claim 11, wherein the detecting means performs the function of the signaling means by the detecting means being designed to generate a signal when the liquid received and collected in the overflow collection reservoir is below the overflow collection reservoir's predetermined full liquid level.

16. An apparatus for maintaining a predetermined full level of a liquid in a container from which liquid continuously passes, comprising:

(a) a main reservoir for the liquid;

(b) means for feeding liquid into the container from the main reservoir at a rate such that the liquid being fed therein overflows from the container through an overflow outlet at a position corresponding to the desired level of liquid in the container;

(c) an overflow collection reservoir designed to receive and collect at least part of the liquid flowing from the overflow outlet, said overflow collection reservoir having at least a first outlet through which liquid flows therefrom to the main reservoir, and a predetermined full liquid level, wherein said first outlet being positioned below said predetermined full liquid level;

(d) means for detecting when the liquid received and collected in the overflow collection reservoir is below the overflow collection reservoir's predetermined full liquid level;

(e) means for generating a signal when said detecting means detects that the liquid received and collected in the overflow collection reservoir is below the overflow collection reservoir's predetermine level; and (f) a vertically-oriented containing wall in fluid communication with said overflow collection reservoir, wherein said containing wall is designed such that, when the liquid received and collected in the overflow collection reservoir is not below the overflow collection reservoir's predetermined full level, liquid flows from the overflow collection reservoir into the containing wall.

17. Apparatus according to claim 16, wherein said detecting means comprises a probe extending vertically downwards to a location below, but spaced apart from, the upper edge of the containing wall, said probe being designed such that an electrically-conducting path exists between it and the liquid flowing into the containing wall only when the liquid is at a level which is high enough such that the liquid physically contacts the probe.

18. Apparatus according to claim 16 wherein the containing wall is in the form of a standpipe into which liquid enters through the standpipe's lower end portion.

19. Apparatus according to claim 17, wherein the containing wall is made from an electrically-conducting material, wherein a closed electrical circuit exists between the probe and the containing wall only when the liquid received and collected in the overflow collection reservoir from the overflow outlet is not below said overflow collection reservoir's predetermined full liquid level, and wherein the existence of a closed electrical circuit between said probe and said containing wall indicates that liquid within the container is not below said container's predetermined full liquid level.

20. Apparatus according to claim 17, wherein the containing wall and the probe are part of a device which is separate from the overflow collection reservoir, and wherein liquid flows from the overflow collection reservoir to the device as long as the liquid collected and received in the overflow collection reservoir from the overflow outlet is not below said overflow collection reservoir's predetermined full liquid level.

21. Apparatus according to claim 16, further comprising a channel through which at least a portion of the total liquid flowing from the overflow collection reservoir to the containing wall returns directly to the main reservoir, and through which another portion of the total liquid flowing from the overflow collection reservoir to the containing wall flows into the containing wall.

22. Apparatus for maintaining a predetermined full level of a liquid in a container comprising:
(a) a main reservoir for the liquid;
(b) means for feeding liquid into the container from the main reservoir at a rate such that the liquid being fed therein overflows from the container through an overflow outlet at a position corresponding to the desired level of liquid in the container;
(c) a overflow collection reservoir designed to receive and collect at least part of the liquid flowing from the overflow outlet, said overflow collection reservoir having at least a first outlet through which liquid flows therefrom to the main reservoir, and a predetermined full liquid level, wherein said first outlet being positioned below said predetermined full liquid level;
(d) means for detecting when the liquid received and collected in the overflow collection reservoir, through the overflow outlet, is below the overflow collection reservoir's predetermined full liquid level;
(e) means for generating a signal when said detecting means detects that the liquid received and collected in the overflow collection reservoir is below the overflow collection reservoir's predetermined full liquid level; and
(f) a vent pipe in gaseous communication with the overflow collection reservoir, wherein said vent pipe extends upwards from the overflow collection reservoir, and wherein at least a portion of said vent pipe is made from a translucent material.

23. Apparatus according to claim 22, wherein said vent means has a slight glass positioned thereon.

* * * * *